United States Patent
Kirla et al.

(10) Patent No.: US 7,304,962 B1
(45) Date of Patent: Dec. 4, 2007

(54) DELAY MEASUREMENT SYSTEM IN A PACKET NETWORK

(75) Inventors: Olli Kirla, Helsinki (FI); Johan Haeggström, Espoo (FI); Tommi Koistinen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/149,725

(22) PCT Filed: Dec. 17, 1999

(86) PCT No.: PCT/EP99/10096

§ 371 (c)(1),
(2), (4) Date: Aug. 13, 2002

(87) PCT Pub. No.: WO01/45291

PCT Pub. Date: Jun. 21, 2001

(51) Int. Cl.
*H04B 3/20* (2006.01)
*H04L 12/66* (2006.01)
*H04J 3/06* (2006.01)

(52) U.S. Cl. .................. 370/289; 370/516; 370/352
(58) Field of Classification Search ................ 370/278, 370/279, 282, 285, 401, 352, 356, 493, 286, 370/287, 288, 289, 290
See application file for complete search history.

(56) References Cited

U.S. PATENT DOCUMENTS 5,477,531 A    12/1995  McKee et al. ................ 370/17
6,215,774 B1*   4/2001  Knauerhase et al. ........ 370/252
6,807,156 B1*  10/2004  Veres et al. .................. 370/252
6,977,945 B1*  12/2005  Noda et al. .................. 370/468
6,985,481 B2*   1/2006  Brent et al. .................. 370/352
7,088,706 B2*   8/2006  Zhang et al. ................ 370/352

FOREIGN PATENT DOCUMENTS

EP       0 895 397 A2    2/1999
WO       WO 00/25487     5/2000

\* cited by examiner

*Primary Examiner*—Hanh Nguyen
(74) *Attorney, Agent, or Firm*—Brake Hughes Bellermann LLP (57) ABSTRACT

The present invention proposes a method of providing information of the echo path of a speech connection in a Packet Data Network, said method comprising the steps of requesting delay information by means for triggering echo removal, said delay information being obtained by signaling a non-speech measurement data unit to said Packet Data Network by an echo estimation means, and measuring the delay of the echo of said measurement data unit by said echo estimation means; replying the echo delay of said measurement data unit from said echo estimation means; generating delay information including at least said echo delay of said measurement data unit; and adjusting a shift register being related to an echo removing device by the use of said delay information such that the performance of said echo removing device is optimized in view of its echo removing capability.

21 Claims, 6 Drawing Sheets

DELAY MEASUREMENT SYSTEM IN A PACKET NETWORK

PRIORITY CLAIM

This is a national stage of PCT application No. PCT/EP99/10096, filed on Dec. 17, 2002. Priority is claimed on that application.

FIELD OF THE INVENTION

The present invention relates to a method of providing information of the echo path of a speech communication in a Packet Data Network, and a communication network and a gateway apparatus using the same method.

RELATED BACKGROUND ART

Networks being based on packet switching as a network with an asynchronous transfer mode (ATM) or a network using the internet protocol (IP) have inconsistent delay characteristics. Typical events as routing, a possible congestion due to the presence of variable length buffers and other protocol handling procedures may easily cause a quite high total end-to-end delay and/or a delay variation.

Some applications like an echo cancellation or an echo suppression need to know the exact round-trip delay for an appropriate echo removing performance. An echo canceller has a limited delay matching capability which nowadays is typically in the range of 0 to 150 ms. An echo canceller can handle the delay variation of a packet switched network easily in this range, but the total round-trip delay may become a problem, since the delays may go far beyond this capability. For example, in networks using the internet protocol (IP) the induced delay may be in the range of 0-1000 ms.

Particularly, this problem may arise if a packet network connection is in the echo path of an echo removing device such as an echo canceller or echo suppressor. Reference is made to ETSI document TR 101 307, wherein such scenarios are described, and to ETSI document EG 201 050, wherein examples for echo suppressors and echo cancellers are given. Moreover, a specification describing the recommendations for internet protocol (IP) terminals regarding acoustic echo controllers is included in the document ITU-T G.167, and a specification describing the recommendations for echo cancellers for Voice over Internet Protocol (VoIP) gateways is included in the document ITU-T G.168.

Such a configuration is needed if an echo removing device at the far-end is missing or if it is malfunctioning in such a way that some echo is leaked through to the near-end. In a native terminal using the internet protocol (IP) in which a high quality echo removing device might be missing, most probably far-end echo is not cancelled sufficiently. Therefore, it is required that the near-end obtains a far-end echo cancellation over the internet protocol (IP) network.

In echo cancellers, the round-trip delay is typically obtained from the estimated echo impulse response which is generated by the adaptive filter of the echo canceller. This delay information is usually used for adjusting the timing of the non-linear processor of the echo canceller. However, if the round-trip delay exceeds the length of the adaptive filter, the echo estimation cannot be modeled, and therefore, the echo is not cancelled. To overcome longer delays, the length of an adaptive filter could be increased. However, a longer filter results in increased processing and memory requirements. Furthermore, the convergence speed is decreased, and the residual echo level and noise floor after the echo estimation and echo subtraction is higher with longer adaptive filters, i.e. the performance is degraded.

An approach to avoid long adaptive filters is a windowed adaptive filter, in which a shift register precedes the adaptive filter. Therein, the length of the shift register could be adjusted according to the round-trip delay such that the peak of the echo impulse response hits somewhere onto the middle of the adaptive filter. By this approach very long round-trip delays can be handled.

In order to cover the whole delay range, which is a requirement in packet switched networks, a delay search method has to be applied. Typically, the delay can be estimated by a cross-correlation algorithm between sent and received signals. For long delays, however, this requires a lot of memory and processing power. Moreover, it takes some time to find the actual delay, and thus, echo might be heard at the beginning of a call.

Apart from that, an echo suppressor does not contain any adaptive filter, and therefore, there are no inherent means to estimate the round-trip delay. However, an echo suppressor needs to know the round-trip delay in order to adjust its switching function to the proper phase according to the round-trip delay. With short delays, like in terminals, a pre-defined fixed timing can be used, whereas longer delays require a delay search method similar to that mentioned above, i.e. if an echo suppressor is used in a packet network it encounters the same problems as a windowed echo canceller.

One known possibility to measure the round-trip delay is that the delay-dependent application, e.g. an echo canceller or suppressor as mentioned herein, measures the delay itself by the use of the echo path impulse response, a cross correlation, etc. from the raw data available. That is, the delay is calculated from the speech sent and the echoed speech heard, i.e. from voice samples.

Unfortunately, it requires too much memory and/or processing power to thereby obtain the desired delay range. Further, a longer time is needed to find the delay value in longer round-trip delays.

Hence, there is a need for an alternative estimation of the echo round-trip delay for a windowed echo canceller and an echo suppressor, if a packet network connection is present in the echo path.

SUMMARY OF THE INVENTION

Therefore, it is an object of the present invention to provide a method of providing information of the echo path of a speech connection in a Packet Data Network which is free from the above drawbacks.

According to the present invention, this object is achieved by a method of providing information of the echo path of a speech connection in a Packet Data Network, said method comprising the steps of requesting delay information by means for triggering echo removal, said delay information being obtained by signaling a non-speech measurement data unit to said Packet Data Network by an echo estimation means, and measuring the delay of the echo of said measurement data unit by said echo estimation means; replying the echo delay of said measurement data unit from said echo estimation means; generating delay information including at least said echo delay of said measurement data unit; and adjusting a shift register being related to an echo removing device by the use of said delay information such that the performance of said echo removing device is optimized in view of its echo removing capability.

This method according to the present invention can be very advantageously modified in that said means for triggering echo removal are related to a delay calculating device by which said delay calculating device requests from said echo estimation means to perform said signaling of a measurement data unit; and said echo delay of said measurement data unit is replied to said delay calculation device which calculates an estimation of a total round-trip delay of said echo path of a speech, which estimation corresponds to said generated delay information, and said calculation is based on said received echo delay of said measurement data unit and other delays which are provided to said delay calculation device.

Other advantageous modifications reside in that said delay calculation device monitors a call signaling device and said delay information request is triggered when a call is established by a call setup signaling of said call signaling device; in that said delay request is triggered during the signaling of a call establishment after a voice channel is activated and a delay is replied before an alerting is signaled; in that after said delay information is replied, said delay calculation is performed, and said shift register is adjusted, it is checked whether an echo path model being present in said delay calculation device is reliable, and if not, said echo removing device calls an echo request procedure again; or in that after said checking of reliability, it is checked whether said call is released, and if not, said checking of reliability is repeated.

Furthermore, according to the present invention, the object can be solved by a communication network system comprising a Switched Circuit Network, a Packet Data Network, a gateway apparatus of said Switched Circuit Network on the interface to the Packet Data Network, wherein said gateway apparatus comprises means for providing delay information of an echo path of a speech connection from said Switched Circuit Network to said Packet Data Network by using control messages of said Packet Data Network, and a gateway apparatus of said Packet Data Network on the interface to the Switched Circuit Network which supports the functions of said gateway apparatus of said Switched Circuit Network.

Moreover, to attain a solution of the present object, according to the present invention there is provided a gateway apparatus comprising means for providing an interface functionality between a Switched Circuit Network and a Packet Data Network; echo estimation means for providing delay information of the echo of a speech connection; a delay calculation device for calculating an estimation of a total round-trip delay of an echo path of said speech connection; a shift register getting an adjustment input from said delay calculation device; and an echo removing device, the performance of which is optimized in view of its echo removing capability by a respective input of said shift register.

According to the present invention, a shorter delay window can be used for the delay search algorithm as compared to the prior art, which saves memory and processing power resources in the echo removing device. Moreover, the delay is found faster by the delay search algorithm. Additionally, the convergence time is faster as the external delay information can be provided for the echo removing device before the actual speech conversation.

According to the present invention, the delay-dependent application uses some specific signaling-like measurement mechanism, i.e. a non-speech measurement data unit like a control message is sent. Examples for such a mechanism are a pinging procedure by the use of the Internet Control Message Protocol ICMP, a procuring of a Real-Time Control Protocol RTCP report, a procuring of an Asynchronous Transfer Mode Operation And Maintenance ATM OAM report, a proprietary signaling procedure or the like.

Of course, the kind of the mechanism used depends on what applications are or can be supported by the far-end application. However, a pinging procedure using the Internet Control Message Protocol ICMP would be already supported by devices using the Internet Protocol IP, i.e. it is a mandatory feature. Further, the Real-Time Control Protocol is included in the protocol according to document ITU-T H.323: "Packet based multimedia communications systems". It is noted that present terminals of the internet fulfill the requirements of this specification (H.323).

Figure 6:
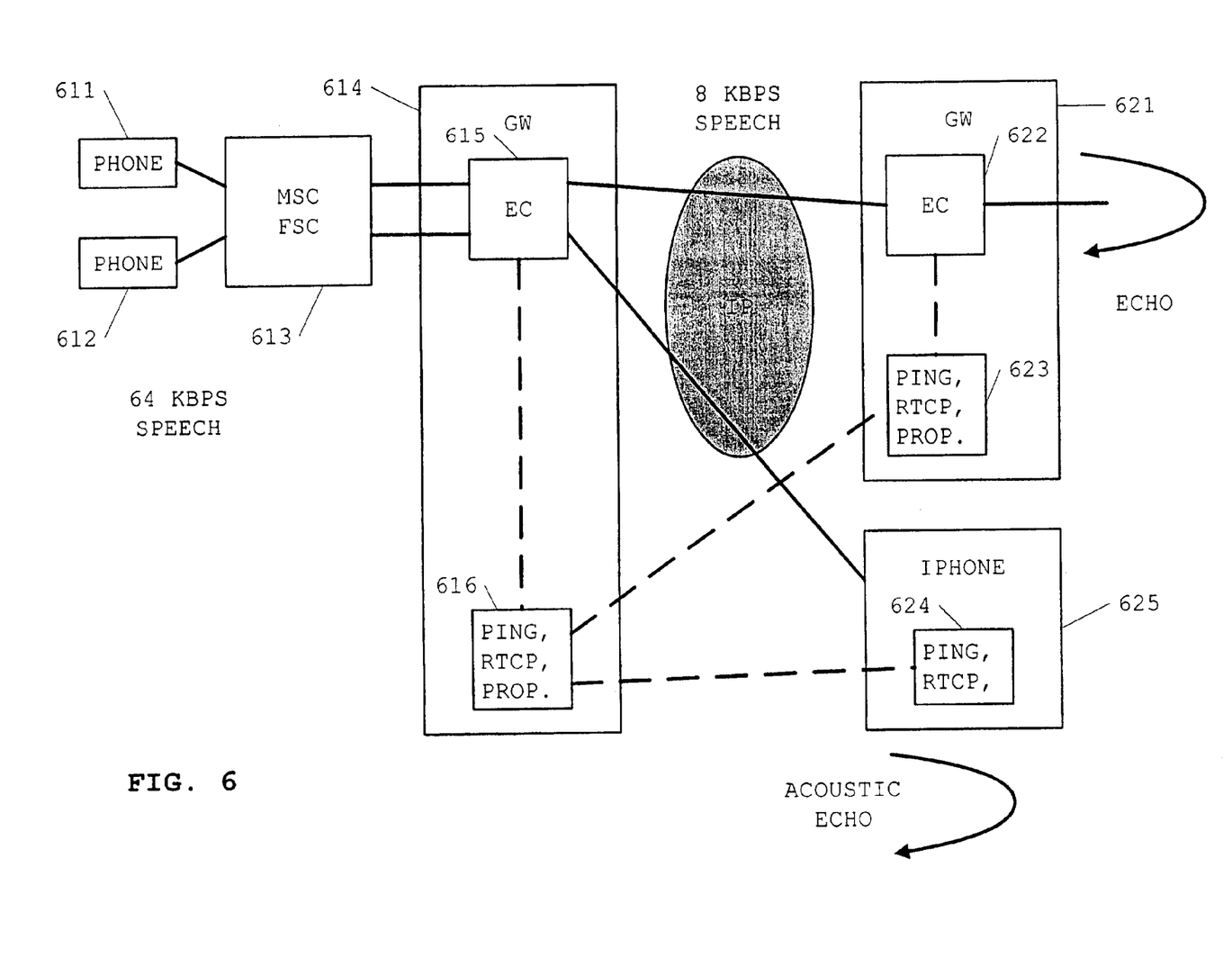
FIG. 6 shows the example of a Voice over Internet (VoIP) network with additional delay measurement mechanisms for illustrating the present invention.

One principal illustration of the present invention is depicted in FIG. 6. Therein, reference numerals 611 and 612 denote terminals of a Switched Circuit Network SCN for transmitting input speech data. Presently, such speech data is typically transmitted with a transfer rate of 64 kbps to a mobile services switching center MSC and fixed switching center FSC 613, respectively.

Further, reference numeral 614 denotes a gateway apparatus including an echo removing device 615 such as an echo canceller EC or an echo suppressor or the like. The gateway apparatus 614 serves for the connection with other network communication entities while the gateway apparatus 614 itself is connected to the mobile services switching center MSC and fixed switching center FSC 613, respectively.

Particularly, as in the case of the present invention, the gateway apparatus 614 can serve for the connection with a Packet Data Network PDN in which, in turn, a gateway apparatus 621 is present for this connection with the gateway apparatus 614. The gateway apparatus 621 may by substantially equal to the gateway apparatus 614 or anyhow different within its usual range of functionality. The echo removing mechanism of the far-end gateway apparatus 621 might be malfunctioning in such a way that echo leaks through to the near-end. Therefore, the echo removing mechanism 615 at the near-end should remove this echo.

According to the present invention, there are means 616, 623 provided which exchange a non-speech measurement data unit by using one of the above mentioned control message procedures as the pinging procedure within the Internet Control Message Protocol ICMP, the Real-Time Control Protocol or a proprietary signaling procedure, or the like.

In FIG. 6 there is depicted an example of a Voice over Internet Protocol (VoIP) network which nevertheless suites for generally describing the present invention, since those who are skilled in the art are fully aware of generalizing this example within the already above indicated range of respective applications.

In detail, echo cancellers EC or echo suppressors are located inside VoIP gateways GW. The gateway GW of the Switched Circuit Network SCN transmits respective speech data to the Gateway GW of the Packet Data Network by using the Internet Protocol IP. Presently, this is for example done with a transfer rate of 8 kbps. However, the interaction between these echo cancellers EC or echo suppressors is established by means of the above mentioned signaling mechanisms. That is, there are means 616, 623 present which communicate with each other by using one of the above protocols and procedures, respectively. By this communication, a measurement data unit is exchanged by the use of which the current network delay is told to the echo removing algorithm of the echo canceller EC or echo suppressor.

Apart from that, it is also possible to insert proprietary timing information to the data stream itself. However, that is not applicable with commercial Internet Protocol clients as indicated in FIG. 6 by the Internet Phone 624.

The delay measurement system in a packet network according to the present invention is especially applicable for enhancing an echo cancellers or echo suppressors working capabilities. According to the present invention, there is provided a better speech quality, a faster convergence and a more efficient implementation of an echo canceller or an echo suppressor.

BRIEF DESCRIPTION OF THE DRAWINGS

The present invention will be described herein below in detail by way of example with reference to the accompanying drawing, in which.

DETAILED DESCRIPTION OF THE PREFERRED EMBODIMENTS

Figure 1:
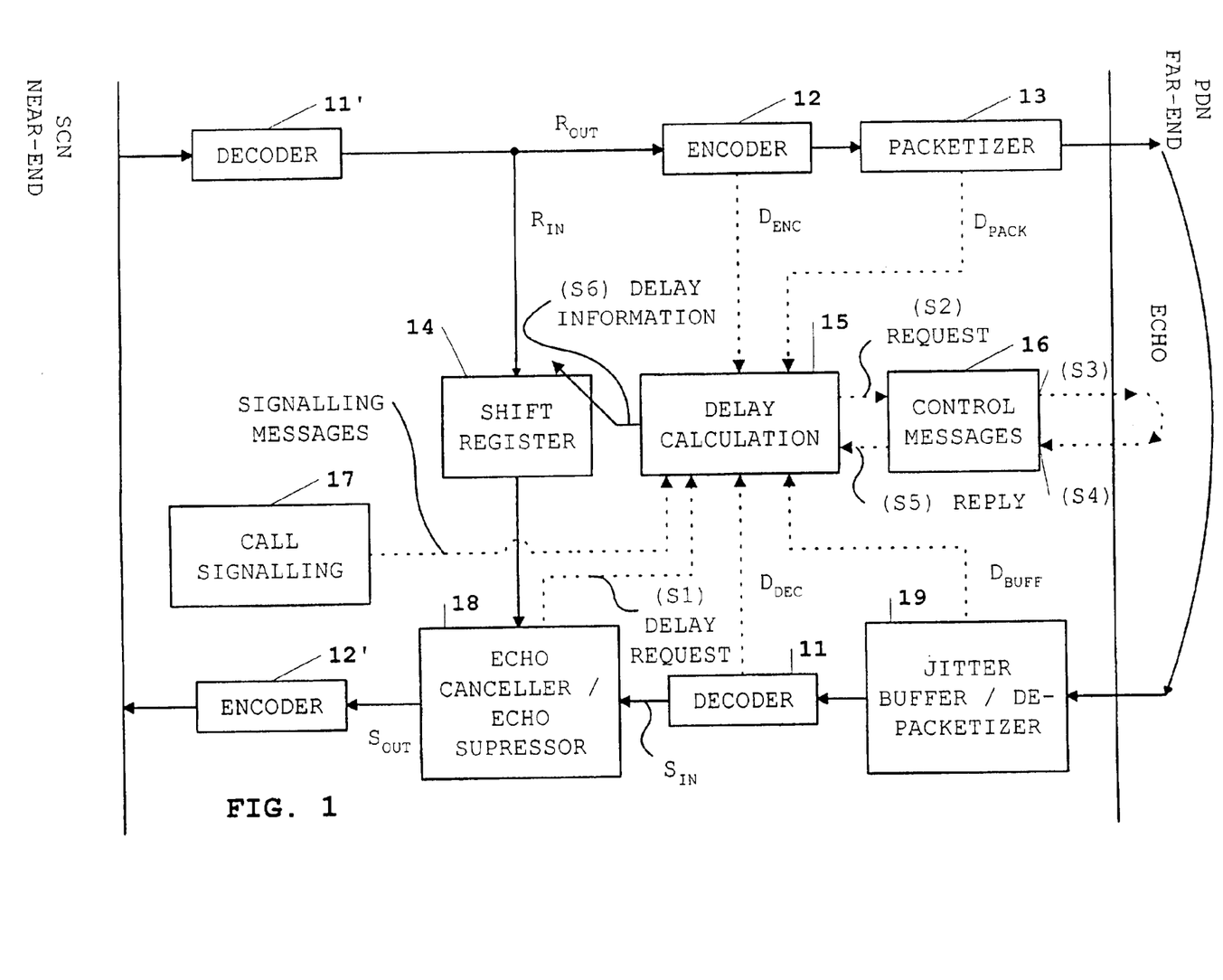
FIG. 1 shows an embodiment of the gateway apparatus according to the present invention.

FIG. 1 shows a detailed block diagram of an echo removing device 18 such as an echo canceller or an echo suppressor being integrated into a gateway apparatus GW between a Switched Circuit Network SCN and a Packet Data Network PDN. Such a gateway apparatus typically comprises speech decoding means 11, 11', speech encoding means 12, 12', packetizing means 13, receive jitter buffer means 19, and an echo canceller. Usually, an echo canceller for the cancellation of the echo of the SCN echo is a mandatory part of a gateway. However, it will not affect the echo removing device of the present invention which removes the echo of the PDN. Therefore, the echo removing device for the removal of the echo of the SCN is omitted in FIG. 1.

Also the speech decoding means 11, 11' and the speech encoding means 12, 12' are not essential for carrying out the present invention. However, they are to be considered, since these means typically produce more delay into a system. This delay would be negligible if a codec according to document ITU-T G.711 is used in the gateway. In this case, encoding means a conversion from linear to a-law (μ-law), and decoding means a conversion from a-law (μ-law) to linear. For the a-law and μ-law encoding, reference is made to e.g. document ITU-T G.711. In contrast thereto, if low bit-rate codecs are used, the throughput delay of the gateway apparatus GW caused by speech coding is in a range of 5 to 50 ms.

The essential blocks of the gateway apparatus according to the present invention which are depicted in FIG. 1 are echo estimation means 16, a delay calculation device 15, a shift register 14, and an echo removing device 18. As mentioned above, the echo estimation means 16 preferably use control messages of a standard or proprietary protocol in a packet network. Standard protocols can be e.g. Internet Control Message Protocol (ICMP), Real-Time Control Protocol (RTCP) or ATM Operation And Maintenance (OAM) messages. According to the present invention, control messages are used to estimate round-trip delays of data packets sent to a far-end gateway GW, a client or the like and echoed back to the gateway GW.

It is noted, however, that in this delay model additional delays caused by speech coding, speech packetizing and receive buffering are not taken into account so far. Therefore, a delay calculation device is needed for the calculation of a comprehensive estimation of the real round-trip delay between the $R_{IN}$ and $S_{IN}$ ports of the echo removing device 18 and shift register 14, respectively.

One possibility to calculate an estimation of the real round-trip delay is as follows:

$$D_{tot} = D_{cont\_mes} + 2 \cdot (D_{enc} + D_{dec}) + D_{pac} + D_{buff}$$

Where
$D_{cont\_mes}$=delay estimation indicated by the control message block (echo estimation means) 16
$D_{enc}$=encoding delay
$D_{dec}$=decoding delay
$D_{pac}$=speech packetizing delay
$D_{buff}$=delay due to jitter buffer It is noted that the encoding and decoding delays have to be multiplied by two because both the gateway GW and far-end application comprises a similar coding method. The packetizing and receive buffering delays of the far-end application might not be known. Therefore, it is safe to include only the delays of the own gateway apparatus GW. Therein, a delay estimation algorithm (e.g. adaptive filter, cross-correlation) within the echo removing device 18 should cope with packetizing, receive buffering, AD/DA conversions and local loop delays of the far-end application.

Hence, according to a method according to the present invention of providing information of the echo path of a speech connection in a Packet Data Network PDN starts in that a respective delay information is requested. This request (S1, S2) corresponding to a triggering of an echo removal may be asked by the echo removing device 18 itself or by the delay calculation device 15.

Anyway, the delay information is obtained by signaling (S3) a non-speech measurement data unit to said Packet Data Network PDN by the echo estimation means 16. The non-speech measurement data unit is preferably one of those discussed above. Accordingly, in the following, the non-speech measurement data unit will be denoted as control message(s). The time between the sending (S3) of a control message and receiving (S4) its echo is measured by the echo estimation means 16. Obviously, this corresponds substantially to the delay generated by the Packet Data Network.

Next, this delay information of the echo delay is replied from said echo estimation means 16 (S5). Preferably, the information is delivered to the delay calculation device 15 to obtain full advantages in that a total round-trip delay of the echo path of a packet switched connection is calculated on the basis of the received echo delay of the control messages. After the calculation of the round-trip delay estimation, the length of the shift register 14 can be adjusted accordingly.

The shift register 14 is related to the echo removing device 18 and the adjustment is executed by the use of the requested delay information such that the performance of said echo removing device 18 is optimized in view of its echo removing capability (S6). If the echo removing device 18 is an echo canceller, the shift register 14 is adjusted such that the returning echo hits on the range of an adaptive filter of this echo canceller, thereby having the performance of the echo canceller optimized in view of its echo removing capability. Whereas, if the echo removing device 18 is an echo suppressor, the shift register 14 is adjusted such that the timing of a switching function of this echo suppressor is appropriate for a round-trip delay of the speech connection, thereby having the performance of the echo suppressor optimized in view of its echo removing capability.

In order to take the delay variations in a PDN into account, it might be necessary to repeat the delay calculation several times. Thus, the estimated delay can be somewhere between the average and maximum delay value.

For this and other reasons, the triggering for the above described method should suitably be possible for both, the delay calculation device 15 and the echo removing device 18. In the following, this will be explained in more detail.

Figure 4:
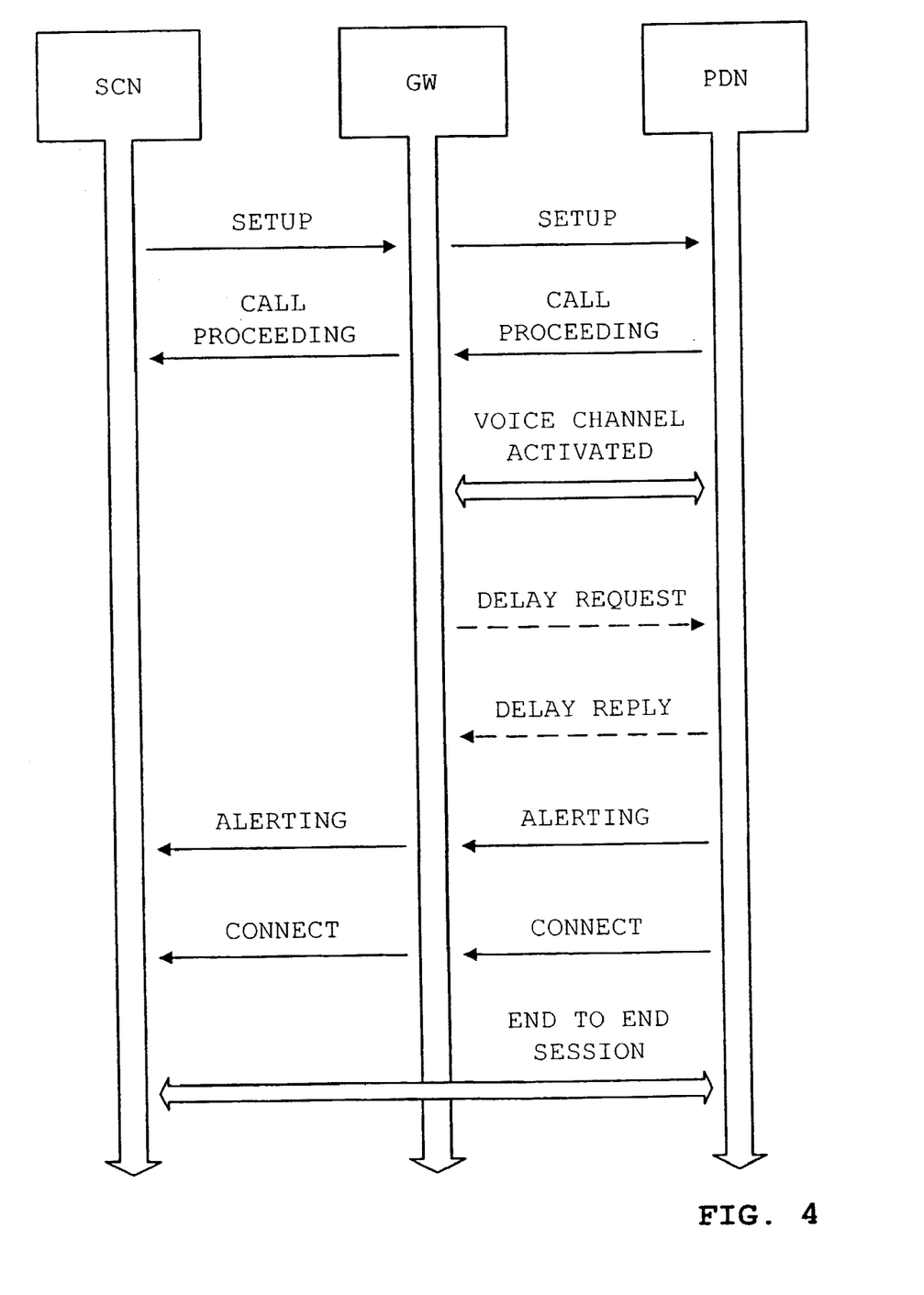
FIG. 4 shows a signaling sequence illustrating a suitable triggering point for the method according to the present invention in a call setup procedure.

A call signaling device as shown in FIG. 1 is responsible for e.g. call establishment in a gateway apparatus GW. The delay calculation device 15 monitors a possible call setup signaling. Whenever the delay calculation device 15 detects a call establishment, it sends a request to the delay estimation means 16 to trigger the delay estimation. A suitable time instant for the request is shown in FIG. 4, where a signaling sequence of a call setup procedure is illustrated having the signaling of the delay measurement included. It is noted that the triggering point for the delay request could in principle be also elsewhere during the call establishment. However, the earlier the point is, the better it is, as there is more time to find a delay estimation before the actual speech conversation (after the connect message shown in FIG. 4). The call setup procedure presented in FIG. 4 corresponds to the specifications ITU-T H.225 and Q.931, and these are to be considered as an example.

Specifically, a setup signaling sequence is transmitted from a Switched Circuit Network SCN over a gateway apparatus GW to a Packet Data Network PDN. The Packet Data Network PDN responds with a call proceedings signaling sequence over the gateway apparatus GW to the Switched Circuit Network SCN. Accordingly, a voice channel is then activated between the gateway apparatus GW and the Packet Data Network PDN. As mentioned above, according to an embodiment of the present invention, at this point a delay request could be signaled from the gateway apparatus GW to the Packet Data Network PDN which, in turn, signals a delay reply back to the gateway apparatus. This request-reply pair, of signaling sequences follows to what is set out here being in accordance with the present invention. Having the delay determined at this point, the following signaling sequences from the Packet Data Network PDN over the gateway apparatus GW to the Switched Circuit Network SCN of alerting and subsequently connecting might already benefit therefrom. Anyway, when the end to end session of the speech connection between the two networks SCN and PDN starts, the delay should have been determined at the latest if no echo shall be heard in the call. However, there is no limitation to that, i.e. if the delay is not determined up to that point, but during the transmission of speech, echo will first be heard but will disappear according to a respective performing of the method according to the present invention.

As the delay can change quite a lot during a call in a PDN, a method to detect these variations is required for the echo removing device 18 (echo canceller/echo suppressor). The delay variations can be handled by the echo removing device 18 if the variations are within the length of internal delay estimation algorithms (e.g. adaptive filter or cross-correlation). However, if the variations exceed the capacity of the echo removing device 18, the echo path model is totally lost and the echo is not removed. Therefore, it should be possible that the echo removing device can also trigger the delay request procedure according to the present invention, if the echo path model is lost or residual echo level is constantly high.

Figure 5:
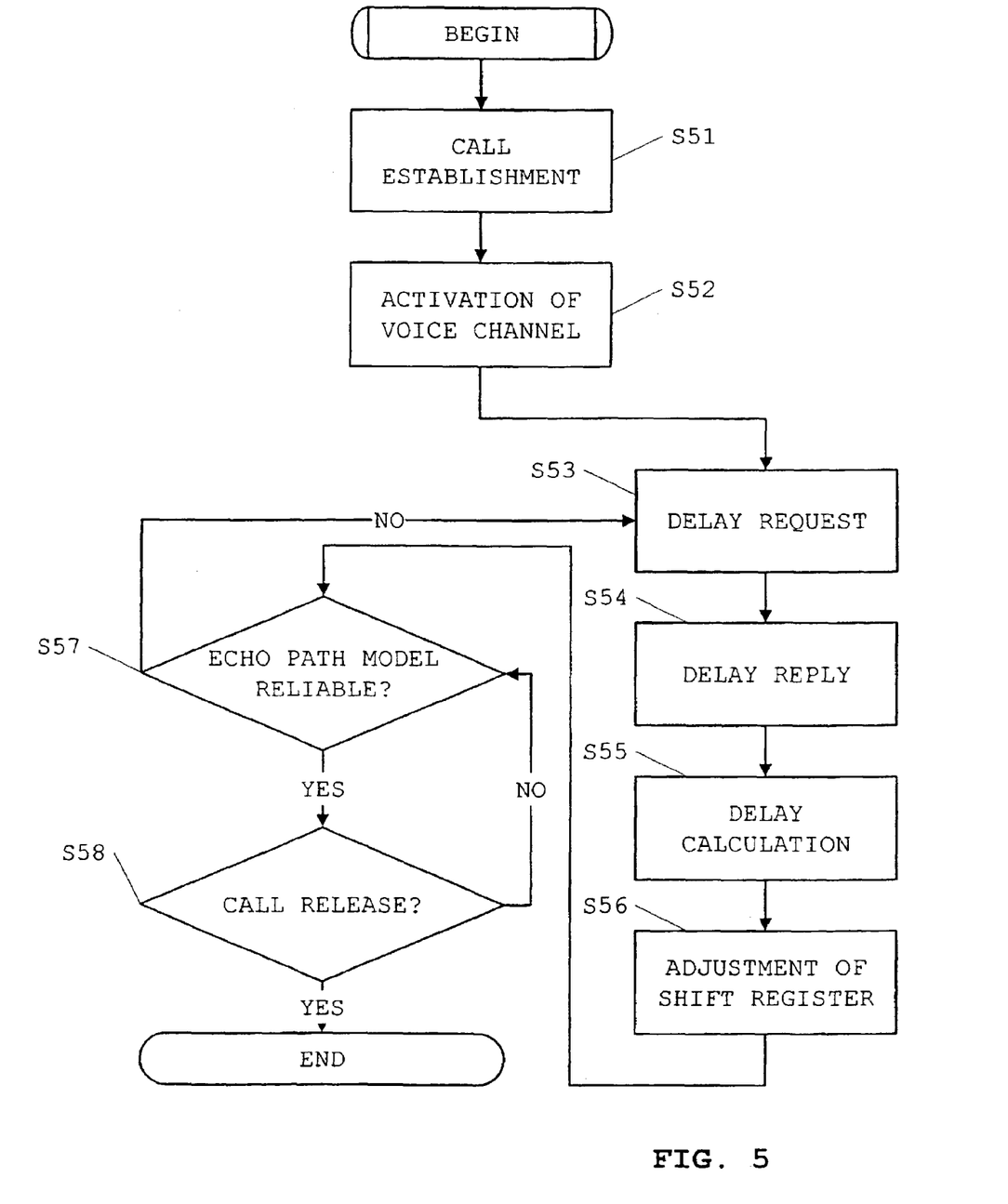
FIG. 5 shows a flow chart illustrating an embodiment of the method according to the present invention.

FIG. 5 shows a flow chart illustrating how the delay request procedure is called during the call establishment and during the call. As mentioned above, the delay request shall be made in a step S53, in this case preferably by the echo removing device 18 itself, after the preceding steps S51 of establishing the call and S52 of activating a voice channel were executed. The subsequent steps S54 to S56 follow according to what has been already described above in this connection. However, after the adjustment of the shift register 14, it is checked in a step S57 whether the echo path model is reliable or not. In case of "no", the procedure returns to step S53 and the delay is requested again. In case of "yes", the procedure proceeds further to step S58 wherein it is questioned whether the call is released or not. Evidently, in case it is, the procedure is ended. Consequently, if the call is not released, the procedure returns to step S57.

Figure 2:
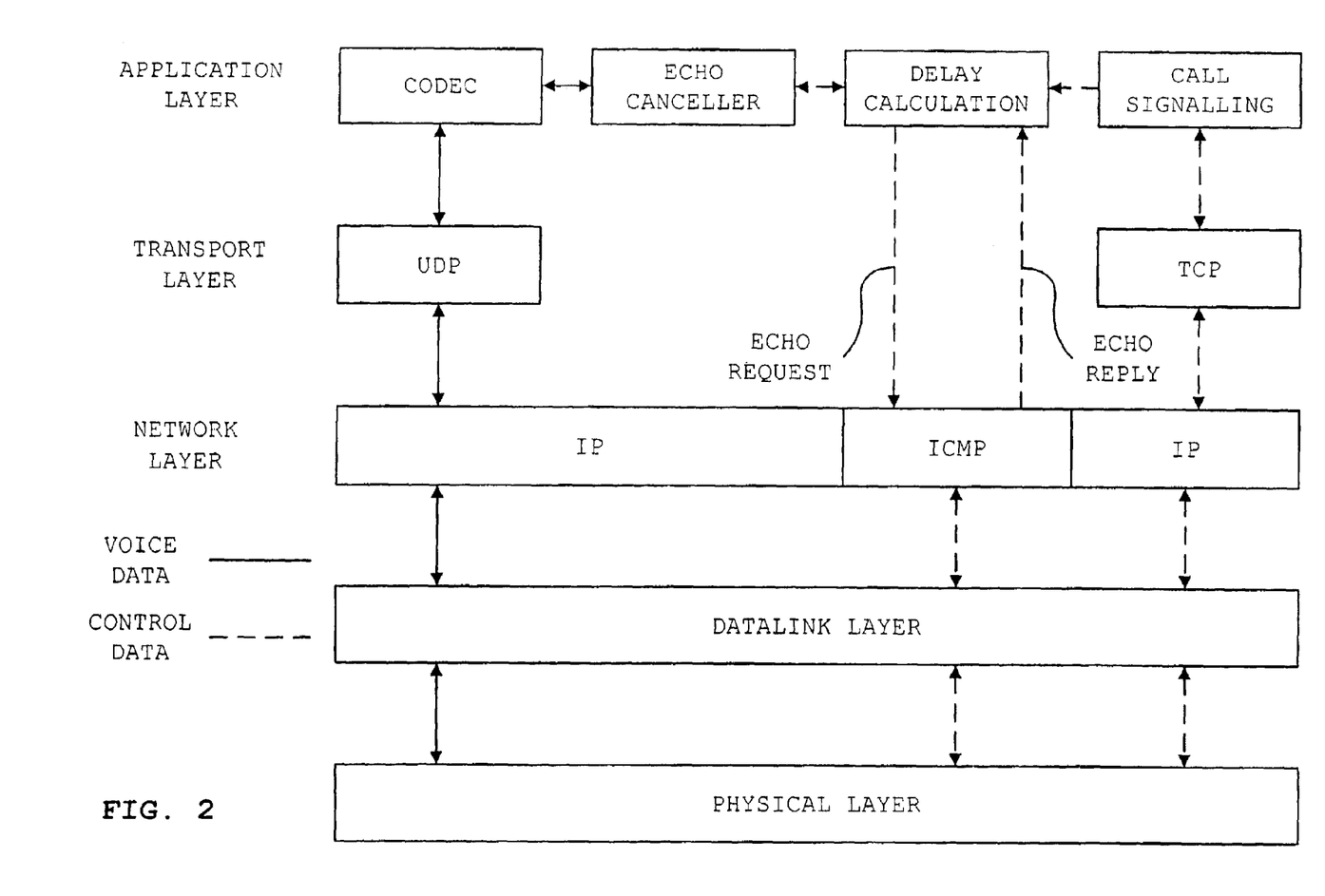
FIG. 2 illustrates an example of how an embodiment of the method according to the present invention could be mapped into the Internet Protocol (IP) hierarchy.
Figure 3:
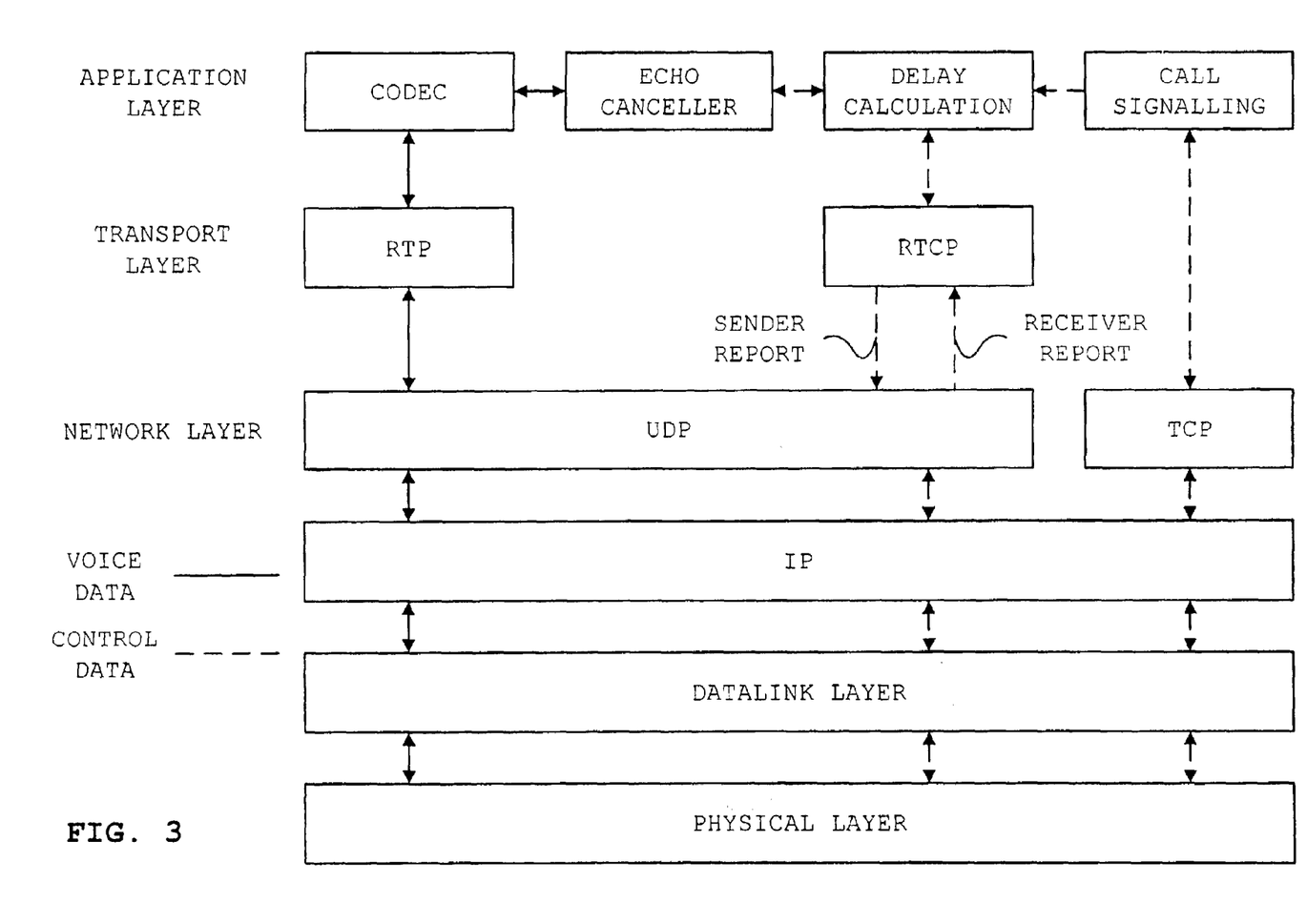
FIG. 3 illustrates another example of how an embodiment of the method according to the present invention could be mapped into the Internet Protocol (IP) hierarchy.

According to the above, the use of control messages within the Internet Protocol is the preferred embodiment of the present invention. Hence, FIGS. 2 and 3 show two examples of how the above described methods can be mapped into the Internet Protocol hierarchy. It is noted that the depicted hierarchy follows the conventional OSI 7 layer model. Full description thereof can be found in respective standard textbooks, additional reference is made to ETSI document TR 102 100.

In FIG. 2 is shown the example if a 'Ping' procedure is utilized as the control messages. Such a Ping procedure is a globally used application within TCP/IP protocol stacks (TCP—Transfer Control Protocol) to estimate round-trip delay around to a far-end host. Therefore, practically every device connected to the IP understands it. A Ping procedure typically uses an echo request of the ICMP and echo reply messages of the ICMP to estimate round-trip delays. In this example the delay calculation device calls the Ping application of the TCP/IP to estimate the round-trip delay. Any voice data is transferred in parallel thereto within UDP/IP packets (UDP—user datagram protocol). Another choice instead of using Ping of TCP/IP stack is that the delay calculation 15 generates itself ICMP echo request and receives ICMP echo reply messages.

In FIG. 3 is shown the example if the Real-Time Protocol RTP and the Real-Time Control Protocol RTCP are used for voice and control data, respectively. The round-trip delay estimation can be calculated from the sender and receiver reports of the RTCP.

As is described above, the present invention proposes a method of providing information of the echo path of a speech connection in a Packet Data Network (see FIG. 1), said method comprising the steps of requesting (S1, S2) delay information by means 18, 15 for triggering echo removal, said delay information being obtained by signaling (S3) a non-speech measurement data unit to said Packet Data Network PDN by an echo estimation means 16, and measuring (S4) the delay of the echo of said measurement data unit by said echo estimation means 16; replying (S5) the echo delay of said measurement data unit from said echo estimation means 16; generating 15 delay information including at least said echo delay of said measurement data unit; and adjusting (S6) a shift register 14 being related to an echo removing device 18 by the use of said delay information such that the performance of said echo removing device 18 is optimized in view of its echo removing capability.

It should be understood that the above description and accompanying figures are only intended to illustrate the present invention by way of example only. The preferred embodiments of the present invention may thus vary within the scope of the attached claims.

What is claimed is:

1. A method for providing information of an echo path of a speech connection in a Packet Data Network, comprising:
   requesting delay information via devices for triggering echo removal, said delay information being obtained by signaling a non-speech measurement data unit to said Packet Data Network via an echo estimation unit and measuring a delay of an echo caused by said non-speech measurement data unit via said echo estimation unit;
   replying to the echo delay of said non-speech measurement data unit from said echo estimation unit;
   generating delay information including at least said echo delay of said non-speech measurement data unit; and
   adjusting a shift register which is related to an echo removing device via said delay information such that performance of said echo removing device is optimized;
   wherein if said echo removing device is an echo suppressor, said shift register is adjusted such that timing of a switching function of said echo suppressor is appropriate for a round-trip delay of said speech connection such that the performance of said echo suppressor with respect to a capability to remove echoes is optimized.

2. The method of claim 1, wherein said devices for triggering echo removal comprise a delay calculating device by which said delay calculating device requests said echo estimation unit to perform said signaling of a measurement data unit; and
   wherein said echo delay of said measurement data unit is replied to by said delay calculation device which calculates an estimation of a total round-trip delay of said echo path of the speech, which estimation corresponds to said generated delay information, and said calculation is based on said received echo delay of said measurement data unit and other delays which are provided to said delay calculation device calculating an estimation.

3. The method of claim 2, wherein said delay calculation device calculates said estimation of a total round-trip delay $D_{tot}$ based on the following relationship:

$$D_{tot} = D_{con\_mes} + 2 \cdot (D_{enc} + D_{dec}) + D_{pac} + D_{buf},$$

wherein $D_{con\_mes}$ denotes the delay measured by said echo estimation unit, $D_{enc}$ denotes the delay caused by an encoding unit, $D_{dec}$ denotes the delay caused by a decoding unit, $D_{pac}$ denotes the delay caused by a speech packetizing unit and $D_{buf}$ denotes the delay due to a jitter buffer unit.

4. The method of claim 2, wherein said delay calculation device monitors a call signaling device and said delay information request is triggered when a call is established by a call setup signaling of said call signaling device.

5. The method of claim 4, wherein said delay request is triggered during the signaling of a call establishment after a voice channel is activated and a reply to said delay request occurs before an alert signal to establish a call is generated.

6. The method of claim 5, wherein after said delay information is replied, said delay calculation is performed, and said shift register is adjusted, a check is performed to determine whether an echo path model present in said delay calculation device is reliable, and if said echo path model present in said delay calculation device is unreliable, said echo removing device calls an echo request procedure again.

7. The method of claim 6, wherein after said reliability is checked, a check is performed to determine whether said call is released, and if said call is unreleased, said check of the reliability is repeated.

8. The method of claim 1, wherein if said echo removing device is an echo canceller, said shift register is adjusted such that a returning echo is within a range of an adaptive filter of said echo canceller such that the performance of said echo canceller with respect to a capability to remove echoes is optimized.

9. The method of claim 1, wherein said measurement data unit is a control message of one of an Internet Control Message Protocol, a Real-Time Control Protocol, Asynchronous Transfer Mode Operation And Maintenance messages and a proprietary signaling procedure.

10. The method of claim 9, wherein, if said Internet Control Message Protocol is applied, a round-trip delay estimation is calculated via a corresponding echo request and echo reply messages, and said delay calculation device contacts this application and voice data is transferred in parallel within User Datagram Protocol packets and Internet Protocol packets, respectively.

11. The method of claim 9, wherein, if said Real-Time Control Protocol is applied, a roundtrip delay estimation is calculated via sender and receiver reports of said Real-Time Control Protocol, and said delay calculation device contacts this application and voice data is transferred in parallel within User Datagram Protocol packets, Internet Protocol packets and Real-Time Protocol packets, respectively.

12. A communication network comprising:
   a Switched Circuit Network;
   a Packet Data Network;
   a gateway apparatus of said Switched Circuit Network on an interface to the Packet Data Network, said gateway apparatus being configured to provide delay information of an echo path of a speech connection from said Switched Circuit Network to said Packet Data Network by using control messages of said Packet Data Network; and
   a gateway apparatus of said Packet Data Network on the interface to the Switched Circuit Network which supports the functions of said gateway apparatus of said Switched Circuit Network;
   wherein if an echo removing device within said network is an echo suppressor, a shift register is adjusted such that timing of a switching function of said echo suppressor is appropriate for a round-trip delay of said speech connection such that a performance of said echo suppressor with respect to a capability to remove echoes is optimized.

13. The network of claim 12, wherein said control messages are of one of an Internet Control Message Protocol, a Real Time Control Protocol, Asynchronous Transfer Mode Operation And Maintenance messages and a proprietary signaling procedure.

14. The network of claim 12, wherein said gateway apparatus further comprises devices for removing echo from said speech connection by using said provided delay information.

15. A gateway comprising
  devices for providing an interface functionality between a Switched Circuit Network and a Packet Data Network;
  an echo estimation unit for providing delay information of the echo of a speech connection;
  a delay calculation device for calculating an estimation of a total round-trip delay of an echo path of said speech connection;
  a shift register which receives an adjustment input from said delay calculation device; and
  an echo removing device, performance of said echo removing device being optimized by a respective input of said shift register;
  wherein if said echo removing device is an echo suppressor, said shift register is adjusted such that timing of a switching function of said echo suppressor is appropriate for a round-trip delay of said speech connection such that the performance of said echo suppressor with respect to a capability to remove echoes is optimized.

16. The gateway apparatus of claim 15, wherein said echo estimation unit is configured to send control messages.

17. The gateway apparatus of claim 15, wherein said echo removing device is an echo canceller and comprises an adaptive filter, a range of said echo removing device being within a range of a returning echo upon said shift register being adjusted appropriately.

18. The gateway of claim 15, wherein said echo removing device is an echo suppressor and comprises a switching function, timing of said switching function being appropriate for a round-trip delay of said speech connection upon said shift register being adjusted appropriately.

19. The gateway apparatus of claim 15, further comprising:
  a call signaling device for signaling during call establishment and transaction of calls via said gateway apparatus;
  wherein said delay calculation device monitors said call signaling device.

20. A gateway comprising:
  means for providing an interface functionality between a Switched Circuit Network and a Packet Data Network;
  echo estimation means for providing delay information of the echo of a speech connection;
  a delay calculation device for calculating an estimation of a total round-trip delay of an echo path of said speech connection;
  a shift register which receives an adjustment input from said delay calculation device; and
  an echo removing device, performance of said echo removing device being optimized by a respective input of said shift register;
  wherein if said echo removing device is an echo suppressor, said shift register is adjusted such that timing of a switching function of said echo suppressor is appropriate for a round-trip delay of said speech connection such that the performance of said echo suppressor with respect to a capability to remove echoes is optimized.

21. A computer-readable medium for providing information of an echo path of a speech connection in a Packet Data Network, the computer-readable medium being encoded with a computer program, the computer program comprising:
  program code for requesting delay information via devices for triggering echo removal, said delay information being obtained by signaling a non-speech measurement data unit to said Packet Data Network via an echo estimation unit and measuring a delay of an echo caused by said non-speech measurement data unit via said echo estimation unit;
  program code for replying to the echo delay of said non-speech measurement data unit from said echo estimation unit;
  program code for generating delay information including at least said echo delay of said non-speech measurement data unit; and
  program code for adjusting a shift register which is related to an echo removing device via said delay information such that performance of said echo removing device is optimized;
  wherein if said echo removing device is an echo suppressor, said shift register is adjusted such that timing of a switching function of said echo suppressor is appropriate for a round-trip delay of said speech connection such that the performance of said echo suppressor with respect to a capability to remove echoes is optimized.

* * * * *